Patented Apr. 15, 1947

2,418,925

UNITED STATES PATENT OFFICE 2,418,925

UREYLENE CARBOCYCLIC COMPOUNDS AND THEIR PREPARATION

Richard C. Clapp, Stamford, and Richard O. Roblin, Jr., Old Greenwich, Conn., assignors to American Cyanamid Company, New York, N. Y., a corporation of Maine No Drawing. Application July 22, 1944, Serial No. 546,205

12 Claims. (Cl. 260—309)

This invention relates to a new class of organic compounds and to methods of preparing the same. More particularly, the invention relates to ureylene carbocyclic fatty acids and to salts and esters thereof.

The new compounds of this invention may be represented graphically by the following general formula:

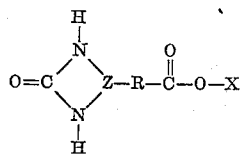

in which Z is a carbocyclic residue, R is an alkylene radical of from 1 to 6 carbon atoms, and X is a member of the group consisting of hydrogen, salt-forming radicals, and ester-forming radicals.

In the general formula, Z may be a five- or six-membered carbocyclic ring of either the unsaturated type such as phenyl, cyclohexenyl, cyclopentenyl, etc., or the saturated type such as cyclohexyl and cyclopentyl. To prepare compounds of the latter type the ureylene ring is first formed on an aromatic ring, and the aromatic ring is then reduced.

In the general formula, R may be a saturated or unsaturated alkylene radical such as methylene, ethylene, propylene, butylene, amylene, hexylene, etc. When the fatty acid attached to the carbocyclic residue is butyric acid, the alkylene radical is propylene; when it is valeric acid, the alkylene radical is butylene, etc.

The salt-forming radicals, which in the general formula are represented by X, include metal, ammonium, and organic amine groups such as sodium, potassium, calcium, magnesium, barium, zinc, copper, silver, mercury, ammonium, diethanolamine, morpholine, quinine, brucine, etc. The salts may be formed, in general, by neutralizing the ureylenecarbocyclic fatty acid with an alkali or alkaline salt-forming substance or by methods of double decomposition. Esters may be formed by heating the acids of the invention with an appropriate alcohol such as methyl, ethyl, allyl, isopropyl, n-butyl, amyl, hexyl, cyclohexyl, and the like. Since methods by which salts and esters of fatty acids can be prepared are known, further description is considered unnecessary.

Compounds corresponding to the general formula above may be prepared by different methods, several of which are illustrated in the specific examples which follow. For example, to prepare gamma-3,4-ureylene-phenyl butyric acid, o-phenyleneurea is caused to react with succinic anhydride by means of a Friedel-Crafts catalyst, such as aluminum chloride or stannic chloride, in a suitable solvent, such as s-tetrachloroethane or nitrobenzene. The reaction will proceed at temperatures ranging from about 50 to 180° C. The product of this reaction is gamma-keto-gamma-3,4-ureylenephenyl butyric acid. Reduction of the carbonyl group may be accomplished by means of hydrogen formed by the action of an acid on a metal. Of course, when other aliphatic dicarboxylic acid anhydrides, such as adipic, pimelic, suberic, etc., are used, other fatty acid derivatives are obtained which correspond in chain length to the number of carbon atoms in the anhydride.

To prepare the compounds in which Z is a saturated carbocyclic group, it is merely necessary to reduce catalytically the benzene ring. For example, gamma-3,4-ureylenecyclohexyl butyric acid may be prepared by catalytically reducing gamma-3,4-ureylenephenyl butyric acid.

When it is desired to prepare compounds in which the fatty acid is ortho to the ureylene ring, we prefer to use as starting material an ortho-aminophenyl fatty acid in which the amino group is blocked as by the substitution thereon of an acyl radical. These compounds are then substituted on the 5-position with a removable group, such as halogen or sulfonic radicals, to obtain, for example, gamma-2-acylamino-5-bromophenyl butyric acid. The resulting product is then nitrated, the nitro group entering the ring at the 3-position. On treating these compounds with sodium amalgam, Raney alloy and alkali, tin and hydrochloric acid or other reducing agent, the nitro group is reduced and the halide or sulfonic acid radical is simultaneously split out. Upon treatment with phosgene or urea a ureylene ring is formed ortho to the fatty acid group to yield compounds of the present invention, in which the carbocyclic ring is unsaturated. Catalytic reduction of the benzene ring yields compounds having a saturated carbocyclic ring.

Among the o-aminophenyl fatty acids that we may employ in this reaction are o-aminophenylbutyric acid, o-aminophenylacetic acid, o-aminophenylcinnamylideneacetic acid, o-aminophenylhexoic acid, and the like. Keto acids such as o-aminobenzoylpropionic acid, o-aminobenzoylbutyric acid, and the like, may also be used, the keto group being subsequently reduced, if desired.

The compounds of the present invention are, generally speaking, white crystalline solids, soluble in water, acetic acid, and aqueous alcoholic mixtures. The acids readily form esters with alcohols and alkali or alkaline earth metal salts with the corresponding alkali or alkaline earth metal hydroxides, carbonates, etc.

The compounds of the present invention are useful because of their bacteriostatic properties and may be used therefor in experimental medicine and in the preparation of chemotherapeutic agents and pharmaceuticals.

Our invention will now be illustrated in greater detail by means of the following specific examples, in which representative ureylene carbocyclic fatty acids are prepared. It will be understood, of course, that these examples are given for purposes of illustration and are not to be considered as limiting our invention to the particular details described therein. Parts are by weight except when otherwise stated.

EXAMPLE 1

*Gamma-(3,4-ureylenephenyl)-butyric acid*

To a stirred mixture of 16 parts of o-phenyleneurea, 12 parts of succinic anhydride, and 600 parts of s-tetrachloroethane is added 64 parts of aluminum chloride at room temperature. The reaction mixture is heated at 100° C. for over one and a quarter hours, at 100–110° C. for one and a quarter hours, and at 110–120° C. for half an hour. It is then poured into dilute hydrochloric acid, and the tetrachloroethane is removed by steam distillation. After the aqueous solution has been filtered, it is concentrated to a small volume under reduced pressure and cooled. The precipitated solid is treated with activated charcoal in sodium bicarbonate solution and reprecipitated by acidification. The acid is further purified by crystallization from alcohol, using activated charcoal.

To 20 parts of granular zinc are added 2 parts of mercuric chloride, 30 parts of water, and 1 part of concentrated hydrochloric acid. After shaking for five minutes, the supernatant liquid is decanted, and the amalgamated zinc is washed once with water. Forty parts of water, 40 parts of concentrated hydrochloric acid, and 0.7 part of gamma-keto-gamma-(3,4-ureylenephenyl)-butyric acid are then added to the flask, and the mixture is refluxed for five hours, an additional 10 parts of concentrated hydrochloric acid being added after two hours of refluxing. The gamma-(3,4-ureylenephenyl)-butyric acid separates when the supernatant solution is decanted from the zinc and cooled. It is purified by treatment with activated charcoal in bicarbonate solution and by crystallization from aqueous alcohol.

EXAMPLE 2

*Gamma-(3,4-ureylenecyclohexyl)-butyric acid*

To 0.54 part of gamma-(3,4-ureylenephenyl)-butyric acid (obtained in Example 1) in 150 parts of glacial acetic acid is added 0.50 part of platinum oxide catalyst, and the mixture is shaken in a hydrogenation apparatus for five and a half hours. The filtered solution is concentrated under reduced pressure, and the gamma-(3,4-ureylenecyclohexyl)-butyric acid is purified by crystallization from water.

EXAMPLE 3

*Delta-(3,4-ureylenephenyl)-valeric acid*

To a stirred mixture of 13 parts of o-phenyleneurea, 11 parts of glutaric anhydride, and 650 parts of s-tetrachloroethane is added 52 parts of aluminum chloride. The reaction mixture is heated at 100° C. for two and three-quarters hours, at 100–110° C. for one hour, and at 110–120° C. for half an hour. It is then poured into dilute hydrochloric acid; the tetrachloroethane is removed by steam distillation, and the filtered aqueous solution is concentrated under reduced pressure. The water-insoluble material is extracted with sodium bicarbonate solution, and acidification yields the crude acid. It is purified by treatment with activated charcoal in bicarbonate solution and by crystallization from glacial acetic acid with the use of activated charcoal.

To 20 parts of granular zinc are added 2 parts of mercuric chloride, 30 parts of water, and 1 part of concentrated hydrochloric acid. After shaking for five minutes, the supernatant liquid is decanted, and the amalgamated zinc is washed once with water. Forty parts of water, 40 parts of concentrated hydrochloric acid, and 1 part of delta-keto-delta-(3,4-ureylenephenyl)-valeric acid are then added to the flask, and the mixture is refluxed for six hours, an additional 10 parts of concentrated hydrochloric acid being added after two and a half hours of refluxing. The supernatant solution is decanted from the remaining zinc, and the product separates on cooling. The delta-(3,4-ureylenephenyl)-valeric acid is purified by crystallization from aqueous alcohol.

EXAMPLE 4

*Delta-(3,4-ureylenecyclohexyl)-valeric acid*

To 0.51 part of delta-(3,4-ureylenephenyl)-valeric acid (obtained in Example 3) in 150 parts of glacial acetic acid is added 0.67 part of platinum oxide catalyst, and the mixture is shaken in a hydrogenation apparatus for about forty-five hours. The filtered solution is concentrated under reduced pressure, and the resulting delta-(3,4-ureylenecyclohexyl)-valeric acid is purified by crystallization from alcohol.

EXAMPLE 5

*Gamma-(2,3-ureylenephenyl)-butyric acid*

A solution of 0.73 part of bromine in 2 parts of glacial acetic acid is added in a period of one hour to a solution of 1 part of gamma-(2-benzoylaminophenyl)-butyronitrile in 10 parts of glacial acetic acid. The solution is allowed to stand for thirty minutes and is then poured into 30 parts of water. Gamma-(2-benzoylamino-5-bromophenyl)-butyronitrile is filtered off and washed with water.

A solution of 1 part of gamma-(2-benzoylamino-5-bromophenyl)-butyronitrile in 10 parts of glacial acetic acid is treated with a solution of 10 parts of glacial acetic acid with 15 parts of fuming nitric acid. The mixture is heated to 50–60° C. for two hours and is then poured over 15 parts of ice. Gamma-(2-benzoylamino-3-nitro-5-bromophenyl)-butyronitrile is filtered off and washed with water.

One part of gamma-(2-benzoylamino-3-nitro-5-bromophenyl)-butyronitrile is added to 10 parts of concentrated hydrochloric acid and the mixture is refluxed for one hour. The reaction mixture is evaporated to dryness under reduced pressure and the residue is washed with ether to remove benzoic acid. The gamma-(2-amino-3-nitro-5-bromophenyl)-butyric acid is then crystallized from alcohol.

One part of gamma-(2-amino-3-nitro-5-bromophenyl)-butyric acid is dissolved in 100 parts of 5% sodium carbonate solution. The resultant solution is then stirred in an atmosphere of nitrogen and heated to 50–60° C. while 200 parts of 2% sodium amalgam is added over a period of two hours. The reaction mixture is then chilled with an ice bath, and phosgene is bubbled through it until the solution is strongly acidic. Gamma-(2,3-ureylenephenyl)-butyric acid precipitates and is filtered off. It is dissolved in aqueous sodium bicarbonate and recovered by acidification and filtration. It is crystallized from acetic acid.

EXAMPLE 6

*Gamma-(2,3-ureylenecyclohexyl)-butyric acid*

A mixture of 1 part of gamma-(2,3-ureylenephenyl)-butyric acid (obtained in the above example), 1 part of platinum oxide catalyst, and 150 parts of glacial acetic acid is shaken under a pressure of 35 pounds of hydrogen for thirty hours. The catalyst is filtered off and the filtrate evaporated to dryness under reduced pressure. The residue of gamma-(2,3-ureylenecyclohexyl)-butyric acid is crystallized from water.

EXAMPLE 7

*Delta-(2,3-ureylenephenyl)-valeric acid*

A mixture of 3 parts of o-acetylaminocinnamylideneacetic acid, 0.2 part of platinum oxide catalyst, and 200 parts of methyl alcohol is shaken in a hydrogenator at a pressure of 45 pounds for two and a half hours. The platinum is then filtered off, and the solution is concentrated under reduced pressure to a white solid. The product is purified by crystallization from aqueous alcohol.

To a solution of 1 part of delta-(2-acetylaminophenyl)-valeric acid in 8 parts of glacial acetic acid is added a solution of 0.7 part of bromine in 2 parts of glacial acetic acid over a period of one and a half hours. The solution is allowed to stand for fifteen minutes and is then poured into 25 parts of water. The product separates as a white solid, which is filtered and washed with water.

A mixture of 20 parts of fuming nitric acid and 15 parts of glacial acetic acid is added to a mixture of 1.5 parts of delta-(2-acetylamino-5-bromophenyl)-valeric acid and 15 parts of glacial acetic acid. The reaction mixture is warmed at 50–60° C. for two hours and is then added to 25 parts of ice water. Delta-(2-acetylamino-3-nitro-5-bromophenyl)-valeric acid separates at once as a light yellow solid.

A mixture of 1.4 parts of delta-(2-acetylamino-3-nitro-5-bromophenyl)-valeric acid and 200 parts of 20% hydrochloric acid is refluxed for three hours. The solid separating from the cooled solution is taken up in ether, and the solution is extracted several times with ether. The combined ethereal solutions are washed with water and dried over sodium sulfate. Removal of the ether yields delta-(2-amino-3-nitro-5-bromophenyl)-valeric acid as an orange solid.

A solution of 1.1 parts of delta-(2-amino-3-nitro-5-bromophenyl)-valeric acid in 110 parts of 5% sodium carbonate solution is stirred in an atmosphere of nitrogen. While the reaction mixture is warmed in a bath at 55° C., 200 parts of 2% sodium amalgam is added over a period of two and a half hours. The flask is then cooled in an ice bath, and when phosgene is bubbled through the solution until it is strongly acidic, a white precipitate of delta-(2,3-ureylenephenyl)-valeric acid separates. It is purified by treatment with Norite in bicarbonate of soda solution and crystallization from glacial acetic acid.

EXAMPLE 8

*Delta-(2,3-ureylenecyclohexyl)-valeric acid*

A mixture of 0.2 part of delta-(2,3-ureylenephenyl)-valeric acid, 0.25 part of platinum oxide catalyst, and 75 parts of glacial acetic acid is shaken under a pressure of 40 pounds of hydrogen for 40 hours. The catalyst is filtered off, and delta-(2,3-ureylenecyclohexyl)-valeric acid is obtained by concentration of the solution under reduced pressure. It is purified by crystallization from water.

We claim:

1. Chemical compounds corresponding to the general formula:

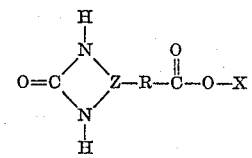

in which Z is a six membered carbocyclic ring, the ureylene nitrogens being attached thereto on adjacent carbon atoms, R is an alkylene radical of from 1 to 6 carbon atoms, and X is a member of the group consisting of hydrogen, alkyl and cycloalkyl radicals.

2. Chemical compounds corresponding to the general formula:

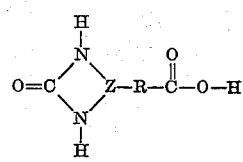

in which Z is a benzene ring the ureylene nitrogens being attached thereto on adjacent carbon atoms and R is an alkylene radical of from 1 to 6 carbon atoms.

3. Gamma-(3,4-ureylenephenyl)-butyric acid.

4. Chemical compounds corresponding to the general formula:

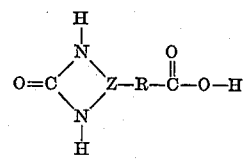

in which Z is a cyclohexyl ring the ureylene nitrogens being attached thereto on adjacent carbon atoms and R is an alkylene radical of from 1 to 6 carbon atoms.

5. Delta-(2,3-ureylenecyclohexyl)-valeric acid.

6. Gamma-(3,4-ureylenecyclohexyl)-butyric acid.

7. In a method of preparing 3,4-ureylenecarbocyclic fatty acids the steps which comprise heating o-phenyleneurea with an aliphatic dicarboxylic acid anhydride having two to seven carbon atoms in the presence of an inert solvent and a Friedel-Crafts catalyst and thereafter reducing the resulting 3,4-ureylenecarbocyclic keto fatty acid by subjecting the said acid to the action of hydrogen to obtain a 3,4-ureylenecarbocyclic fatty acid.

8. In a method of preparing 3,4-ureylenecarbocyclic fatty acids the steps which comprise heating together at a temperature of from about 50° to about 180° C. o-phenyleneurea and an aliphatic dicarboxylic acid anhydride having two to seven carbon atoms in the presence of an inert solvent and aluminum chloride and thereafter reducing the resulting 3,4-ureylenecarbocyclic keto fatty acid and subjecting the said acid to the action of hydrogen to obtain a 3,4-ureylenecarbocyclic fatty acid.

9. In a method of preparing 3,4-ureylenephenyl fatty acids the steps which comprise heating together o-phenyleneurea and an aliphatic dicarboxylic acid anhydride having two to seven carbon atoms in the presence of s-tetrachloroethane and aluminum chloride and thereafter reducing the resulting 3,4-ureylenephenyl keto fatty acid by treating the said acid with hydrogen formed in its presence by the action of an acid on a metal to obtain a 3,4-ureylenephenyl fatty acid.

10. A method of preparing 3,4-ureylenecyclohexyl fatty acids which comprises heating together o-phenyleneurea and an aliphatic dicarboxylic acid anhydride having two to seven carbon atoms in the presence of an inert solvent and aluminum chloride to produce a 3,4-ureylenephenyl keto fatty acid and thereafter subjecting said acid to the action of hydrogen produced in its presence by the action of an acid on a metal whereby the keto group is reduced, followed by treatment of the product with hydrogen in the presence of a hydrogenating catalyst whereby the phenyl radical is reduced.

11. In a method of preparing 3,4-ureylenephenylbutyric acid the steps which comprise heating together o-phenyleneurea and succinic acid anhydride in the presence of s-tetrachloroethane and aluminum chloride to produce 3,4-ureylenephenyl keto butyric acid and thereafter reducing said acid by treatment with hydrogen formed in its presence by the action of an acid on a metal to give 3,4-ureylenephenylbutyric acid.

12. In a method of preparing 3,4-ureylenecyclohexylbutyric acid the steps which comprise heating together o-phenyleneurea and succinic acid anhydride in the presence of s-tetrachloroethane and aluminum chloride to produce 3,4-ureylenephenyl keto butyric acid and thereafter subjecting said acid to the action of hydrogen formed in its presence by the action of an acid on a metal whereby the keto group is reduced, then subjecting the product to the action of hydrogen and a hydrogenation catalyst whereby the phenyl group is reduced to give 3,4-ureylenecyclohexylbutyric acid.

RICHARD C. CLAPP.
RICHARD O. ROBLIN, Jr.

REFERENCES CITED

The following references are of record in the file of this patent:

UNITED STATES PATENTS

| Number | Name | Date |
|---|---|---|
| 675,627 | Israel et al. | June 4, 1901 |
| 2,149,494 | Ballauf | Mar. 7, 1939 |

OTHER REFERENCES

Kilmer et al., Jour. Biol. Chem., vol. 145 (1942), pp. 495–509. (Copy in 260–309.9.)